(12) United States Patent
Chamberlain

(10) Patent No.: US 7,178,284 B2
(45) Date of Patent: Feb. 20, 2007

(54) DEVICE FOR RELEASING FISHING LINE USED WITH DOWNRIGGER

(76) Inventor: Keith Chamberlain, 202 Kinsey Rd., Barton, VT (US) 05822

( * ) Notice: Subject to any disclaimer, the term of this patent is extended or adjusted under 35 U.S.C. 154(b) by 42 days.

(21) Appl. No.: 10/970,430

(22) Filed: Oct. 22, 2004

(65) Prior Publication Data

US 2006/0086035 A1   Apr. 27, 2006

(51) Int. Cl.
*A01K 91/00* (2006.01)
(52) U.S. Cl. .................................... 43/43.12
(58) Field of Classification Search .............. 43/43.12, 43/44.88, 44.92
See application file for complete search history.

(56) References Cited

U.S. PATENT DOCUMENTS

| | | | | |
|---|---|---|---|---|
| RE25,650 E | * | 10/1964 | Strumpf | 43/43.12 |
| 3,800,459 A | | 4/1974 | Swanby | |
| 3,874,110 A | | 4/1975 | Larson | |
| 3,930,330 A | * | 1/1976 | Black | 43/17 |
| 4,031,652 A | | 6/1977 | Johnson | |
| 4,173,091 A | * | 11/1979 | Emory, Jr. | 43/43.12 |
| 4,212,127 A | * | 7/1980 | Daniels | 43/43.12 |
| 4,221,068 A | | 9/1980 | Roemer, Jr. | |
| 4,395,841 A | | 8/1983 | Cudnohufsky | |
| 4,656,776 A | * | 4/1987 | Macachor | 43/43.12 |
| 4,696,124 A | | 9/1987 | Wille | |
| 4,809,457 A | * | 3/1989 | Macachor | 43/43.12 |
| 4,856,224 A | | 8/1989 | Fincher, Sr. | |
| 4,872,281 A | | 10/1989 | Burgess | |
| 4,905,401 A | | 3/1990 | Fukumoto | |
| 4,945,670 A | * | 8/1990 | Wetherald | 43/43.12 |
| 5,170,581 A | * | 12/1992 | Lyons | 43/43.12 |
| 5,177,894 A | * | 1/1993 | Dunsford | 43/43.12 |
| 5,197,223 A | * | 3/1993 | Spurgeon | 43/43.12 |
| 5,337,510 A | | 8/1994 | McCue | |
| 5,495,691 A | * | 3/1996 | Keisala | 43/43.12 |
| 5,921,015 A | * | 7/1999 | Newell et al. | 43/43.12 |
| 6,192,619 B1 | | 2/2001 | Pirkle | |

FOREIGN PATENT DOCUMENTS

DE   38 06 886 A1   9/1989

* cited by examiner

*Primary Examiner*—Kurt Rowan
(74) *Attorney, Agent, or Firm*—Richard C. Litman

(57) ABSTRACT

The device for releasing fishing line used with downrigger includes a body with a front face angled to a bottom face. A downrigger aperture is orientated parallel to front face. A chamber is configured for slidable movement of an adjustable magnetic engaging member. A magnetic body is within the chamber for magnetically engaging with the adjustable magnetic engaging member. A fishing line retaining mechanism is on the body, for releasably holding a fishing line release member, which is releasably held to the fishing line retaining mechanism at one end, and pivotally connected to the magnetic engaging member at the other end, so that the fishing line retaining mechanism releases a fishing line when a force, such as a fish strike, is sufficient to overcome the magnetic attraction between the magnetic body and the magnetic engaging member.

16 Claims, 7 Drawing Sheets

DEVICE FOR RELEASING FISHING LINE USED WITH DOWNRIGGER

BACKGROUND OF THE INVENTION

1. Field of the Invention

The present invention relates generally to fishing line retaining and releasing devices, and more particularly to a fishing line device for releasing fishing line used with a downrigger.

2. Description of the Related Art

Trolling involves pulling fishing line behind a slow moving boat. Because the forward movement of the boat tends to cause the fishing line and the fishing lure or hook attached to the end of the fishing line to rise in the water, a downrigger is employed to maintain the fishing lure at the desired depth for the type of fishing being sought. Downriggers generally have a weighted line or cable to which a fishing line is attached to by means of a downrigger release mechanism or device, which releases the fishing line when a fish strikes the lure.

Although various types of downrigger release devices or mechanisms have been employed, many of these devices are designed for catching large fish, and the releasing force required to detach the fishing line from the device on some of these devices cannot be adjusted. While other devices may employ an adjust means for adjusting the releasing force, these adjustments are sometimes inadequate or unsatisfactory for the requirements of different species of fish, such as small fish. Additionally, some devices are not adaptable for light tackle. Still other types of devices do not provide a means to adjust both the fishing line tension between the fishing rod and the device and the fishing line tension between the device and the lead fishing line connected to the lure.

Accordingly, there is a need for a device for releasing fishing line used with downrigger, which is adaptable for small fish. Additionally, there is a need for a device for releasing fishing line used with downrigger, which can be used with light tackle. Furthermore, there is a need for a device for releasing fishing line used with downrigger, which provide a means to adjust both the fishing line tension between the fishing rod and the device and the fishing line tension between the device and the lead fishing line connected to the lure. Thus, a device for releasing fishing line used with downrigger solving the aforementioned problems is desired.

SUMMARY OF THE INVENTION

The fishing line release device is used with a downrigger and incorporates two separate adjustable tension settings for releasing a fishing line from the downrigger. The first adjustable tension setting is called the vertical tension setting, which controls the amount of fishing rod pressure the fisherman wants to exert for setting the hook when a fish strikes the fishing lure. The second adjustable tension setting is called the horizontal tension setting, which controls the releasing force required by a fish to release the fishing line from the device. Advantageously, for example, the fishing rod can be set at a high tension for turbulent water without effecting the tension required for a small fish, such as a 6-inch trout fish, to release the line. Thus, the tension force applied to the fishing lure to release the fishing line from the device remains at the desired original setting.

The device includes a body, which has a front face integrally connected to a top face and a bottom face. The front face is orientated in a generally angular relationship with respect to the bottom face. A downrigger aperture is configured to frictionally hold a downrigger cable to the body at a predetermined length. The downrigger aperture is disposed between the top face and the bottom face and is orientated in a generally parallel relationship with respect to the front face. A chamber having opposing first and second end portions is disposed within the body. The first end portion of the chamber defines an interior end wall configured for securing a magnetic body therein and the second end portion of the chamber defines an exterior opening configured for slidable movement of a magnetic engaging member.

The magnetic body has opposing front and rear portions. The magnetic body is positioned in the chamber so that the front portion of the magnetic body is adjacent to the end wall of the chamber and the rear portion of the magnetic body faces the exterior opening of the chamber.

The magnetic engaging member has a head portion constructed and arranged for magnetically engaging with the magnetic body and a movable adjusting arm, which extends axially rearward from the head portion. The movable adjusting arm is constructed and arranged such that movement of an adjusting knob that is connected to the movable adjusting arm, changes the length to the movable adjusting arm thereof, which increases or decreases the distance between the head portion of the magnetic engaging member and the magnetic body; and hence, the magnetic force applied to the head portion of the magnetic engaging member by the rear portion of the magnetic body.

A fishing line retaining mechanism is arranged and configured to releasably hold a fishing line release member. The fishing line retaining mechanism is disposed on the body and is adjustable for adjusting the holding force that is applied to fishing line release member.

The fishing line release member is adapted and configured for releasably attaching a fishing line with a fishing lure extending therefrom. The fishing line release member includes a first end portion and a second end portion. The first end portion is releasably held to the fishing line retaining mechanism and the second end portion is pivotally connected to the magnetic engaging member.

The magnetic engaging member slidably moves away from the magnetic body when a force is applied to the fishing lure, which extends from the fishing line that is releasably attached to the fishing line release member, sufficiently to overcome the magnetic force being applied to the head portion of the magnetic engaging member by the rear portion of the magnetic body. The movement of the magnetic engaging member moves the fishing line release member in a rearwardly direction away from the body, which causes the fishing line release member to disengage and pivot away from the fishing line retaining mechanism, and which results in the fishing line being released from the fishing line release member.

These and other advantages of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
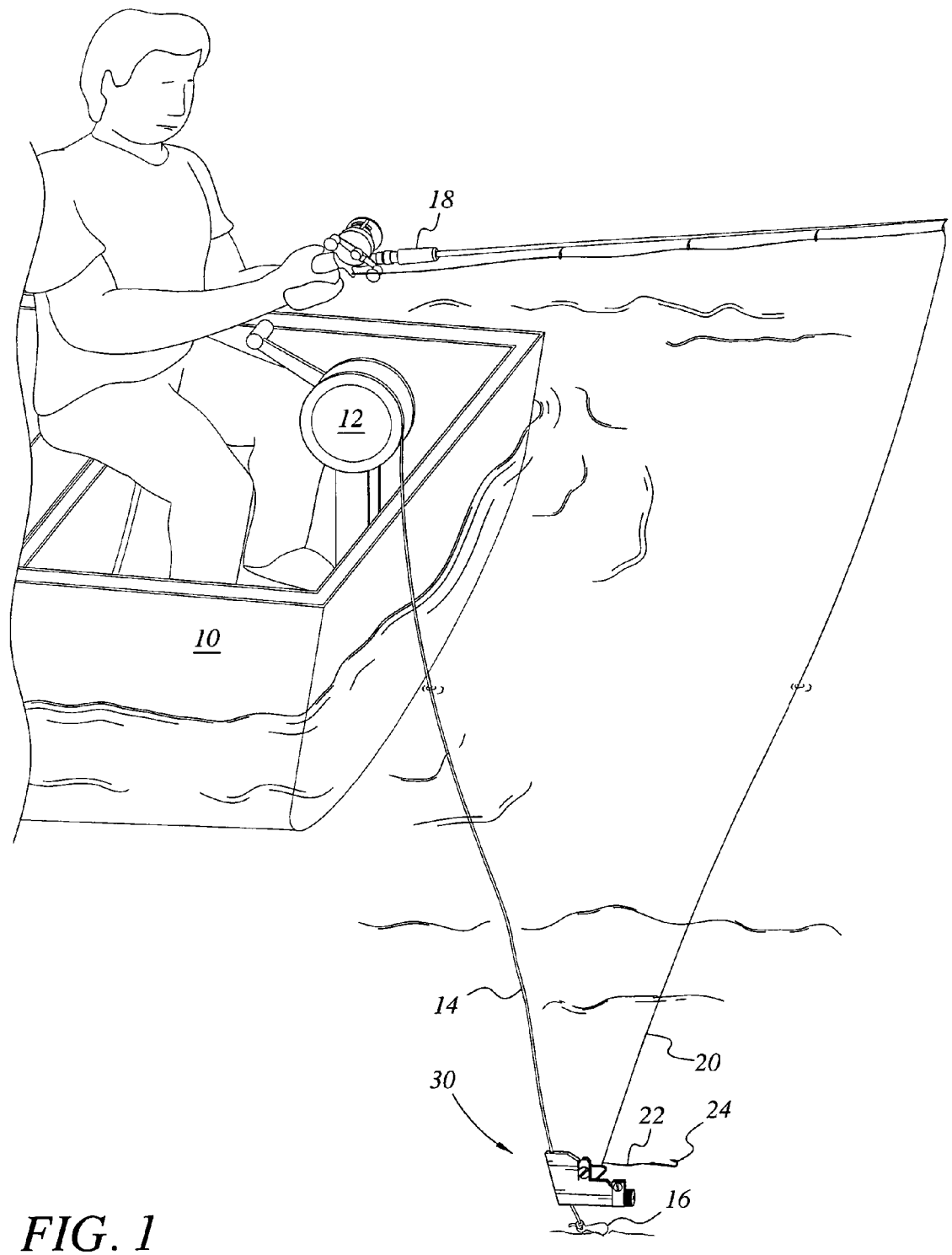
FIG. 1 is an environmental, perspective view of a device for releasing fishing line used with a downrigger according to the present invention.

Turning now to the drawings, FIG. 1 shows a fishing line release device for releasing fishing line used with a downrigger, generally indicated at 30, of the present invention in a typical arrangement. A downrigger cable 14 extends from a downrigger 12 on the transom or gunwales of a boat 10 to a downrigger weight 16, which is sufficiently heavy to maintain the downrigger cable 14 at a steep angle despite the trolling speed of the boat 10. The fishing line 20 is connected to the fishing rod 18 and extends into the water and is releasably held at a predetermined depth by the device 30, which is attached to the downrigger cable 14. The lead fishing line 22 extends rearwardly from the device 30 in a generally horizontal plane with respect to the trolling boat 10. The length of the lead fishing line 24 can vary depending on the fishing conditions. A fishing lure or hook 24 is attached to the lead fishing line 22 for catching fish. The fishing lure 24 trails behind the device 30 at substantially the same depth. When a fish strikes the lure 24 with sufficient force, the tension on the fishing line, releases it from the device 30, so that the fisherman can proceed to reel in the fish.

As shown in FIGS. 2–5, the fishing line release device 30 includes a body 32, a magnetic engaging member 34 slidably mounted to the body 32, a detachable hinge body 70 operatively connected to the magnetic engaging member 34, a fishing line retaining mechanism 36 or adjustable clip 50 disposed on the body 32, and a fishing line releasing member 62, which is pivotally connected to the detachable hinge body 70 and releasably held by the fishing line retaining mechanism 50.

The magnetic engaging member 34 is constructed and arranged to movably hold the detachable hinged body 70 adjacent to body 32. The magnetic engaging member 34 includes a head end portion 84 for magnetically engaging the magnetic body 32, a movable arm 90, which extends from the head portion 84 for threadably engaging the threaded aperture 82 of the detachable hinged body 70, and an adjustment knob 92 fixed to end portion of the movable arm 90 for adjusting the magnetic force between the magnetic engaging member 36 and magnetic body 94. The magnetic engaging member 34 is slidably mounted within the body 32 and is longitudinally movable in a relatively parallel direction with respect to fishing line release mechanism or arm 62, so as to disengage the detachable hinge body 70 from the body 32 when a force being sufficient to overcome the magnetic force between the magnet body 94 and the magnetic engaging member 34 is applied to the fishing lure 24 of the lead fishing line 22, which is releasably attached to fishing line release arm 62.

The body 32 has a front face 38 that is integrally connected to a top face 39 and a bottom face 40. The front face 38 is orientated in a generally angular relationship with respect to the bottom face 40. A downrigger aperture 46 is configured to frictionally hold the downrigger cable 14 to the body 32, so that the device 30 can be set at a predetermined length or depth for catching fish. The downrigger aperture 46 is disposed between the top face 39 and the bottom face 40 and is orientated in a generally parallel relationship with respect to the front face 38. Alternatively, a sleeve can be inserted inside the downrigger aperture 46 to facilitating holding the downrigger cable or line 14. The body 32 has a recess, cavity, U-shaped saddle, groove, or slot 44 for receiving a portion of the fishing line release member or arm 62.

The angle between the front face 38 and the bottom face 40 is generally in the range from 5 to 40 degrees, and preferably from 10 to 30 degrees. Likewise, the angle between the downrigger aperture 46 and the bottom face 40 is generally in the range from 5 to 40 degrees, and preferably from 10 to 30 degrees. The angle will depend on the desired trolling speed. For example, the faster the trolling speed of the boat the greater the angle between the front face 39 and the bottom face 40 will be in order to maintain the lead fishing line 22 in a relatively parallel plane with respect to the boat 10.

Preferably, the body 32 is made of a non-ferrous material, for example polymeric materials, such as nylon, plastic, rubber, or other suitable materials that have corrosive resistant properties. The body 32 is preferably made from a molding process, such as an injection molding process, where the body 32 can be formed in one piece or alternatively, two pieces and then integrally connected together to form a whole piece.

The body 32 defines a chamber or internal passage 48, which is orientated within the body 32 in a relatively parallel plane with respect to the bottom face 40, so as to define a generally longitudinal horizontally axis therein. The chamber or passage 48 has opposing first and second end portions 47 and 49. The first end portion 47 defines an interior end wall, which is configured for securing a magnetic body 94 therein. The second end portion 49 defines an exterior opening or rear exterior opening, which is configured for slidable movement of the magnetic engaging member 34. The chamber or passage 48 is preferably generally cylindrical with a longitudinal axis relatively perpendicular to a hinge axis of the detachable hinge body 70.

The magnetic body 94 has opposing front and rear portions 96 and 98. The magnetic body 94 is positioned within the chamber so that the front portion 96 of the magnetic body 94 is adjacent to the end wall 47 of the chamber 48 and the rear portion 98 of the magnetic body 94 faces the exterior opening 49 of the chamber 48. The magnetic body 94 is formed of ferromagnetic material, such as iron, which has a high degree of magnetism. The magnetic body 94 is preferably a generally cylindrical shape.

The magnetic engaging member 34 has a head portion 84 that is constructed and arranged for magnetically engaging with the magnetic body 94. The magnetic engaging member 34 also has a movable adjusting arm 90, which extends axially rearward from the head portion 84. An adjusting knob 92 is connected to the end portion of the movable adjustable arm 90. The movable adjusting arm 90 is constructed and arranged such that movement of the adjustable knob 92 will change the length to the movable adjusting arm 90 thereof, which results in increasing or decreasing the distance between the head portion 84 of the magnetic engaging member 34 and the magnetic body 94; and hence, the magnetic force that is applied to the head portion 84 of the magnetic engaging member 34 by the rear portion 98 of the magnetic body 94.

The movable adjusting arm 90 is a threaded member or shaft 90, which extends axially from the exterior opening 49 of the chamber 48 of body 32 and is operatively connected to the detachable hinged body 70. The detachable hinged body 70 includes first and second legs 72 and 74 that are substantially parallel with respect to each other and extend generally upwardly from side edge portions of detachable hinged body 70. The first and second legs 72, 74 define a space, recess, cavity, or channel 80 therebetween for pivotally mounting the fishing releasing member or arm 62.

The detachable hinged body 70 includes a hinge 68 and a threaded aperture 82. The hinge 68 is pivotally connected to the second arm end portion 66 of the fishing line release arm 62 for pivotal movement about a hinge axis between a fishing line holding position, wherein the first arm end portion 64 is releasably held by a clip or adjustable clip 50, and a fishing line releasing position, wherein the first arm end portion 64 is released from and pivoted clear of the adjustable clip 50.

The magnetic engaging member 34 is preferably generally cylindrical for slidably movement within the chamber 48. The magnetic engaging member 34 is made of a ferrous material, which is magnetically attractive and is corrosive resistant. However, the movable adjusting arm 90 can be a non-ferrous material. Additionally, the head portion 84 can be a second magnet for magnetically engaging the magnetic body 94.

Alternatively, the magnetic engaging member 34 includes a plunger 90 slidably mounted within the chamber 48 of the body 32 and longitudinally movable in an axially direction relative to an axis of the chamber 48. The plunger 90 is movable between a fishing line holding position, wherein an inner end portion 84 of the plunger 90 extends into the chamber 48, so as to magnetically engage the magnetic body 94 and hold the fishing releasing member or arm 62 within the fishing releasing mechanism 36 or adjustable clip 50, and a fishing line releasing position, wherein an exterior end portion 92 of the plunger 90 is operatively connected by the hinged body 70 to the fishing releasing member or arm 62, so as to disengage the plunger 90 from the magnetic body 94 when the fish strikes the fishing lure of the fishing line with sufficient force to overcome the magnetic attraction between the magnetic body 94 and the plunger 90, which causes the plunger 90 to move the fishing releasing member or arm 62 away from the fishing releasing mechanism 36 or adjustable clip 50, pivoting the fishing releasing member or arm 62 and releasing the fishing line therefrom.

The fishing line retaining mechanism 36 is arranged and configured to releasably hold the fishing line release member 62. The fishing line retaining mechanism 36 is disposed on the body 32 and is adjustable for adjusting the holding force being applied to the fishing line release member 62.

The fishing line retaining mechanism 36 includes a clip or adjustable clip 50 having a first member 52 and a second member 54 that extend in side-by-side relationship to each other. The first and second members 52, 54 have interior surfaces with angular protrusion thereof, which are oriented in opposed relationship to each other for retaining the fishing line release member or arm 62.

The adjustable clip 50 includes first and second movable arms 52, 54 that extend generally upwardly from opposing side edges of the body 32, so that a gap 42 is formed between the adjustable clip 50 and the body 32. The first and second movable arms 52, 54 include opposing fingers configured for retaining the fishing line release member or arm 62. The first and second movable arms 52, 54 are movable into an abutting relation with each other by a fastener 60.

The fastener 60, such as a screw or bolt, is inserted though hole 56 disposed on the first movable arm 52 and threadably engages an adjustment nut or threaded hole 58 mounted or disposed on the second movable arm 54. The fastener 60 adjusts the spacing of the first and second movable arms 52, 54.

Alternatively, the adjustable clip 50 includes first and second gripping arms 52, 54 that extend generally upward from opposing side edge portions of the body 32, and an adjustment member 60 inserted through a hole 56 disposed on first gripping arm 52 and threadably engaging a threaded hole or nut 58 disposed on second gripping arm 54 for adjusting the gripping thereof. The first and second gripping arms 52, 54 include opposing interior surfaces with angular protrusions thereof for releasably gripping said fishing line release member or arm 62.

The fishing line release member or arm 62 is adapted and configured for releasably attaching the fishing line 20. The fishing line 20 is wrapped around the fishing line release member, so that the lead fishing line 22 extends rearwardly from the body 32 in generally parallel plane with respect to the bottom face 40. The lead fishing line 22 has a fishing hook or lure 24 attached thereto for a fish to strike, which results in a tension force being applied in the general direction indicated by arrow A. The striking force required by the fish to slidably move the magnetic engaging member 34 from a fishing line holding position to a fishing line releasing position is determined by the adjustable magnetic attraction settings between the head portion 84 and the magnetic body 94.

The fishing line release member or arm 62 includes a first end portion 64 and a second end portion 66. The first end portion 64 is releasably held to the fishing line retaining mechanism 36. The second end portion 66 is pivotally connected to the magnetic engaging member detachable hinged body 70.

The fishing line release arm 62 is constructed and arranged for releasably attaching a fishing line thereon. The fishing line release arm 62 includes opposing first and second arm end portions 64, 66 and at least one bend therebetween. The second arm end portion 66 has a loop configured to receive a pivot member 68 for pivotally mounting to the detachable hinged body 70. The first arm end portion 64 is relatively straight for releasably engaging the fishing releasing mechanism 36 or adjustable clip 50. Preferably, the fishing line release arm 62 has at least two bends. The fishing line release arm 62 is generally S-shape configuration.

Figure 5:
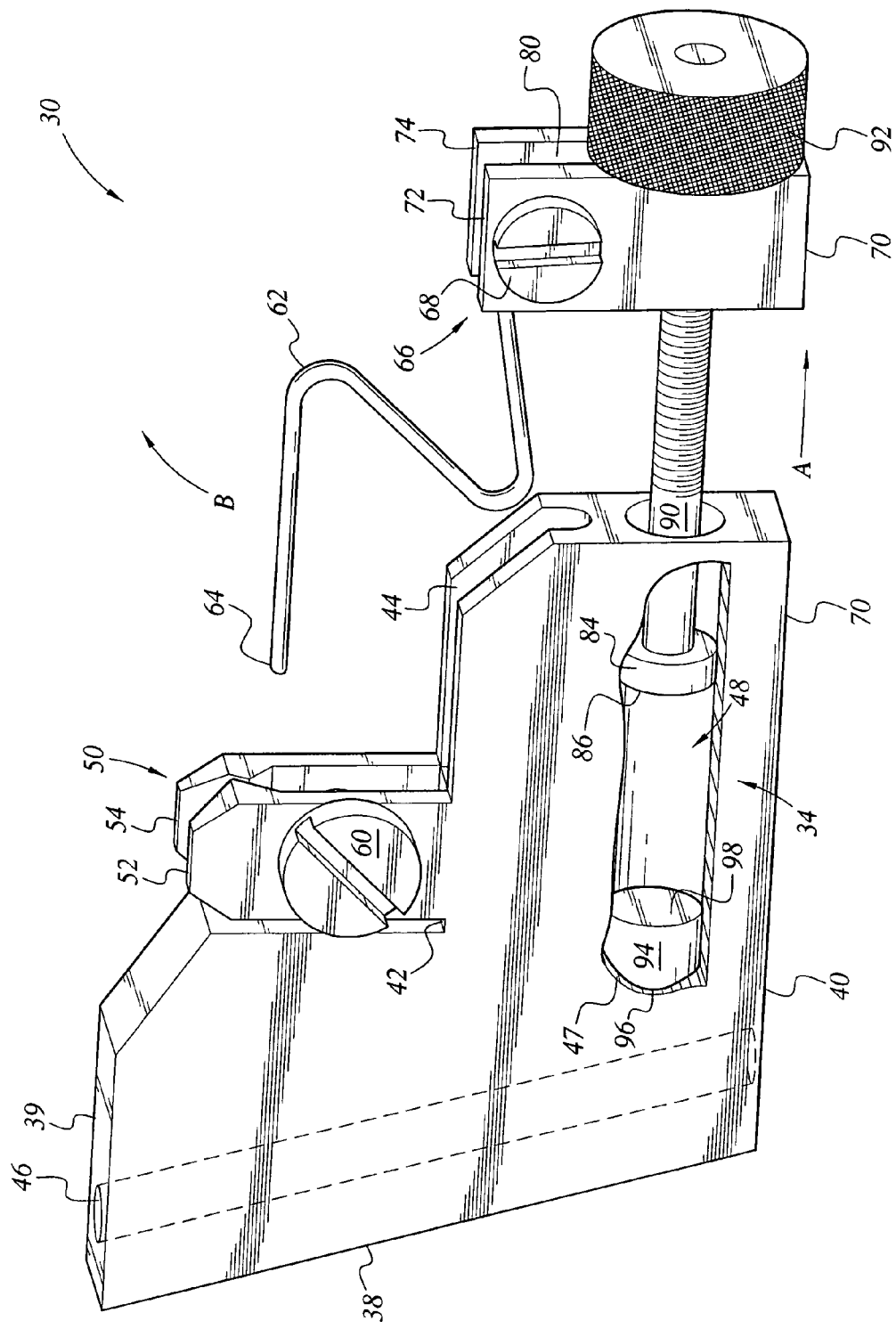
FIG. 5 is an elevational view of a devise for releasing fishing line used with a downrigger according to the present invention showing a fishing line releasing position.

In operation, as illustrated in FIG. 5, the magnetic engaging member 34 slidably moves away from the magnetic body 94, in the general direction of arrow A, when a pulling force is applied to the fishing lure, which extends from the lead fishing line, that is sufficient to overcome the magnetic force being applied to the head portion 84 of the magnetic engaging member 34 by the rear portion 98 of the magnetic body 94. The movement thereof moves the fishing line release member 62 in a generally rearwardly direction away from the body 32, which causes the fishing line release member 62 to disengage and pivot in the general direction of arrow B away from the adjustable clip 50. Thus, resulting in the fishing line being released from the fishing line release member 62.

Figure 6:
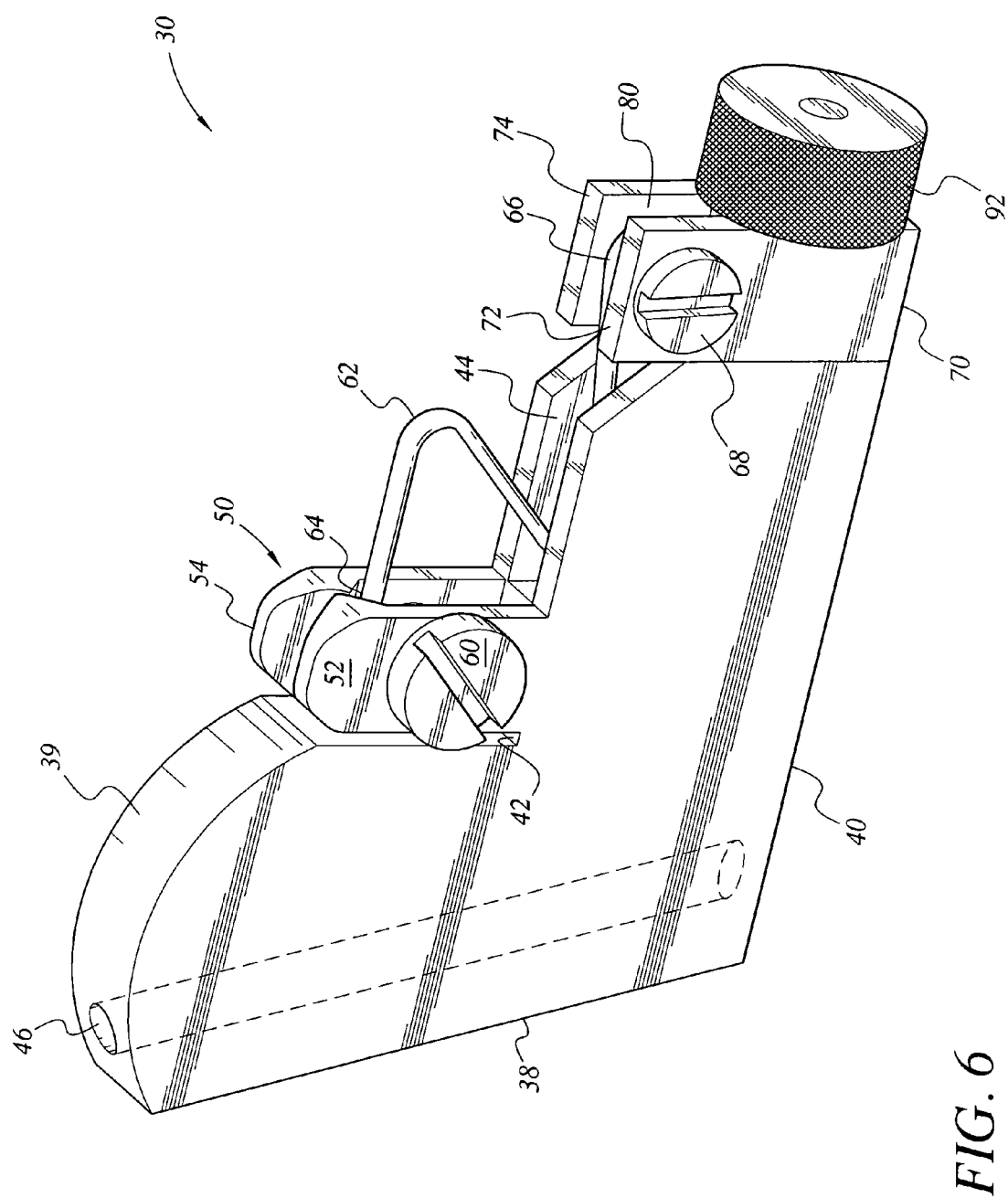
FIG. 6 is an elevational view of a second embodiment of a devise for releasing fishing line used with downrigger according to the present invention with the body having an arcuate top face.

FIG. 6 shows an alternative embodiment, which is substantially similar to the above description, except the top face 39 is generally arcuate, convex, or curved.

Figure 2:
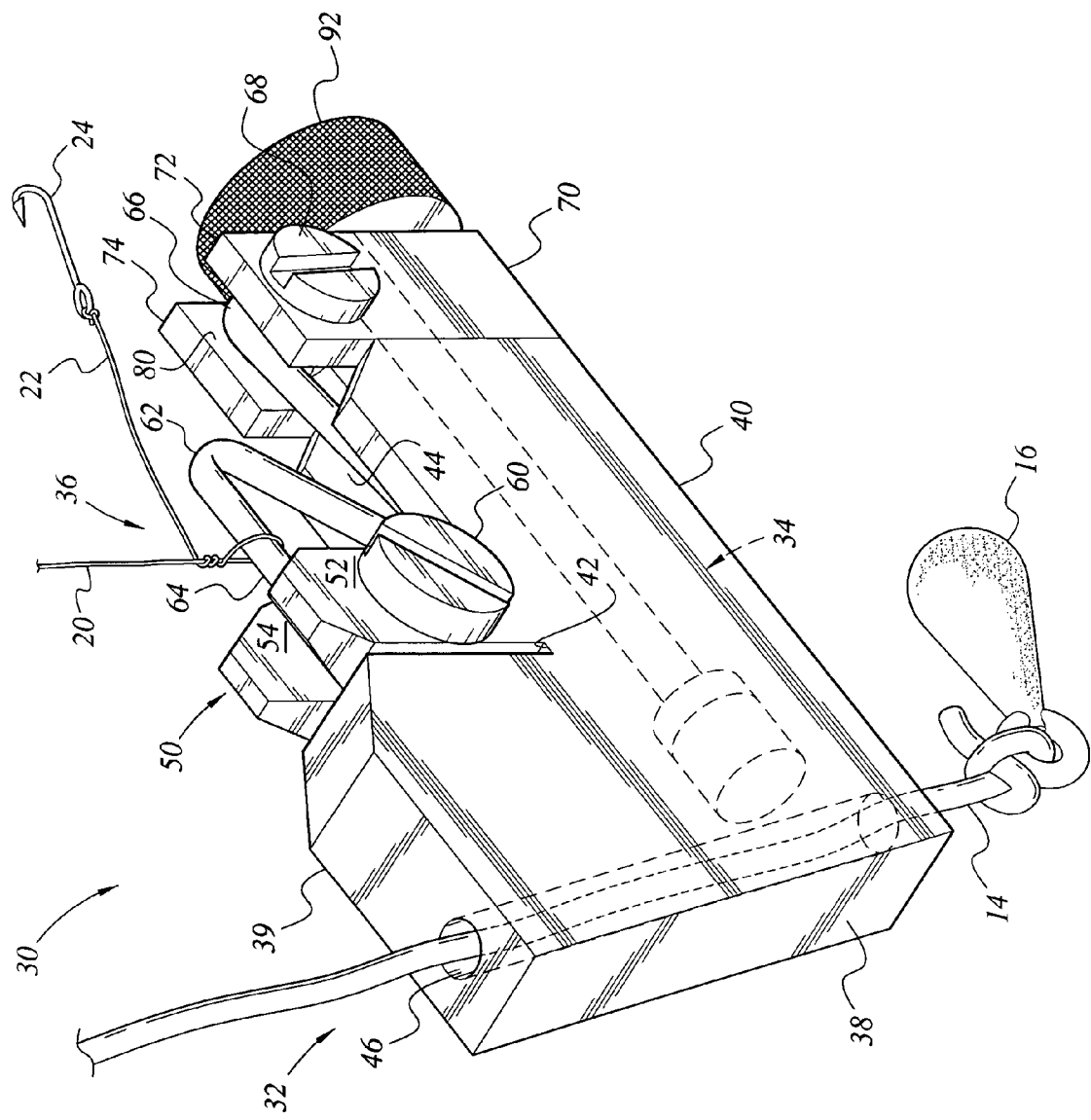
FIG. 2 is a perspective view of a devise for releasing fishing line used with a downrigger according to the present invention showing the downrigger cable and the fishing line attached thereto.
Figure 3:
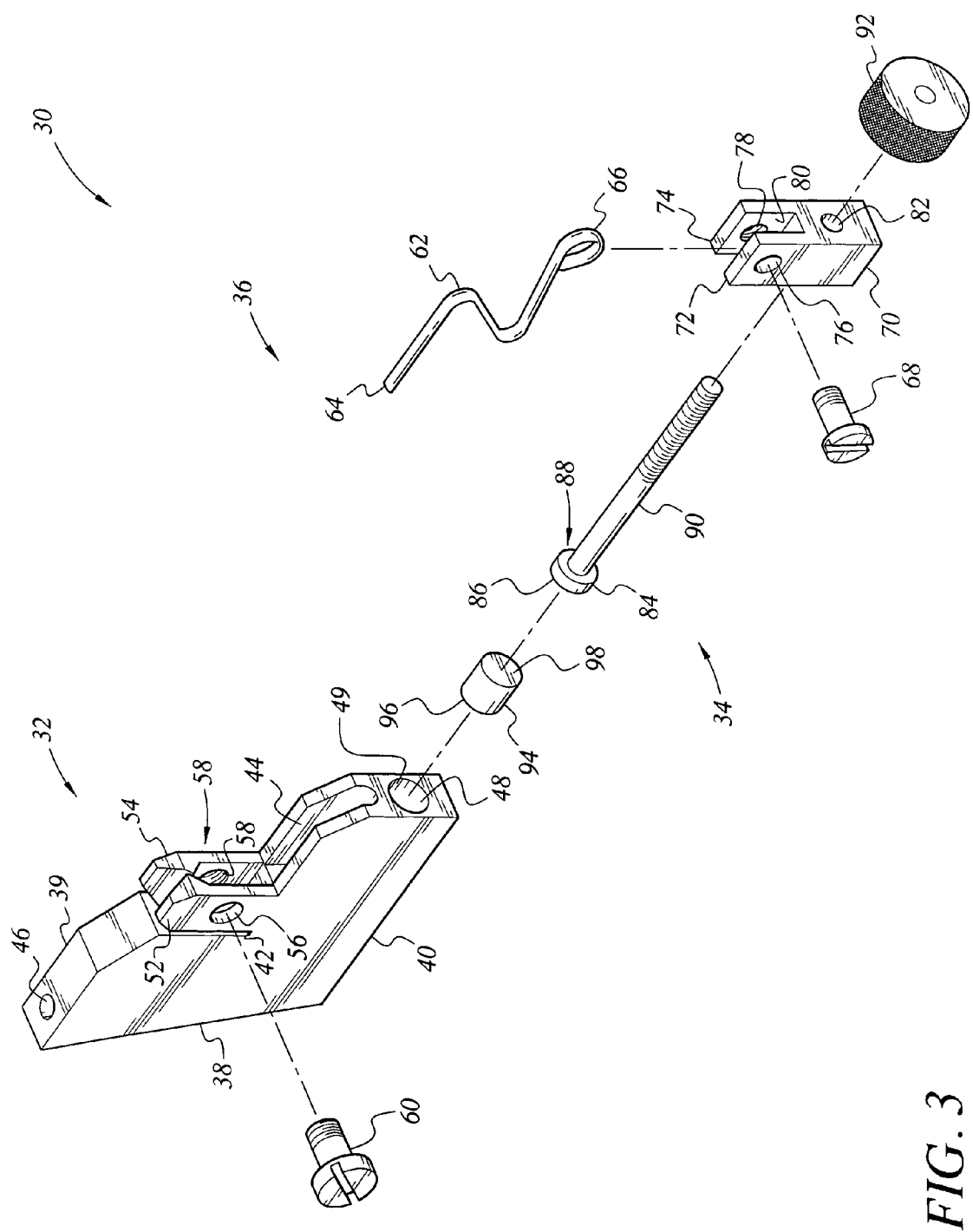
FIG. 3 is an exploded view of the devise of FIG. 2, with the downrigger cable and the fishing line omitted.
Figure 4A:
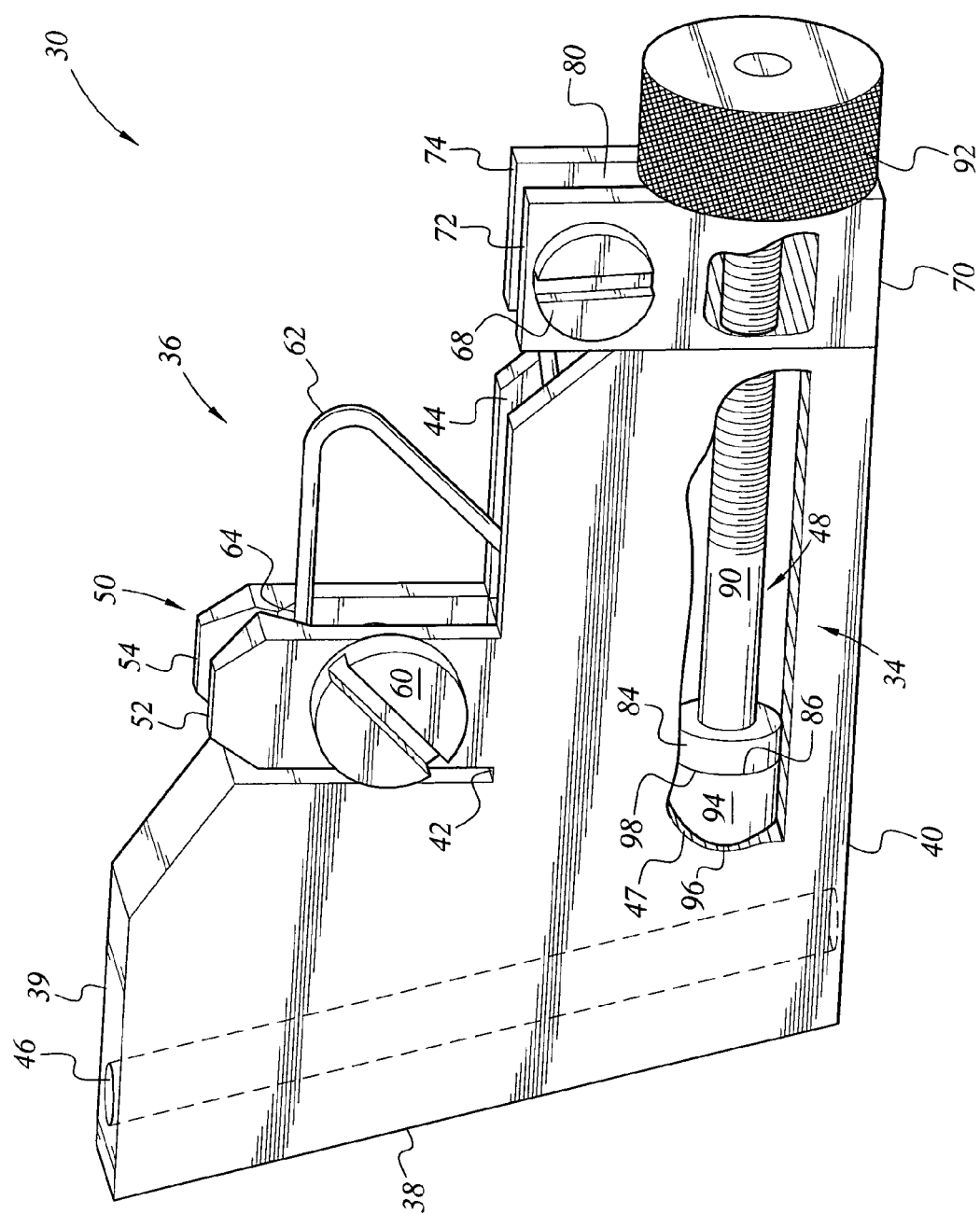
FIG. 4A is an elevational view of a devise for releasing fishing line used with a downrigger according to the present invention with part of the body cut away to show one tension setting position of the magnetic engaging member.
Figure 4B:
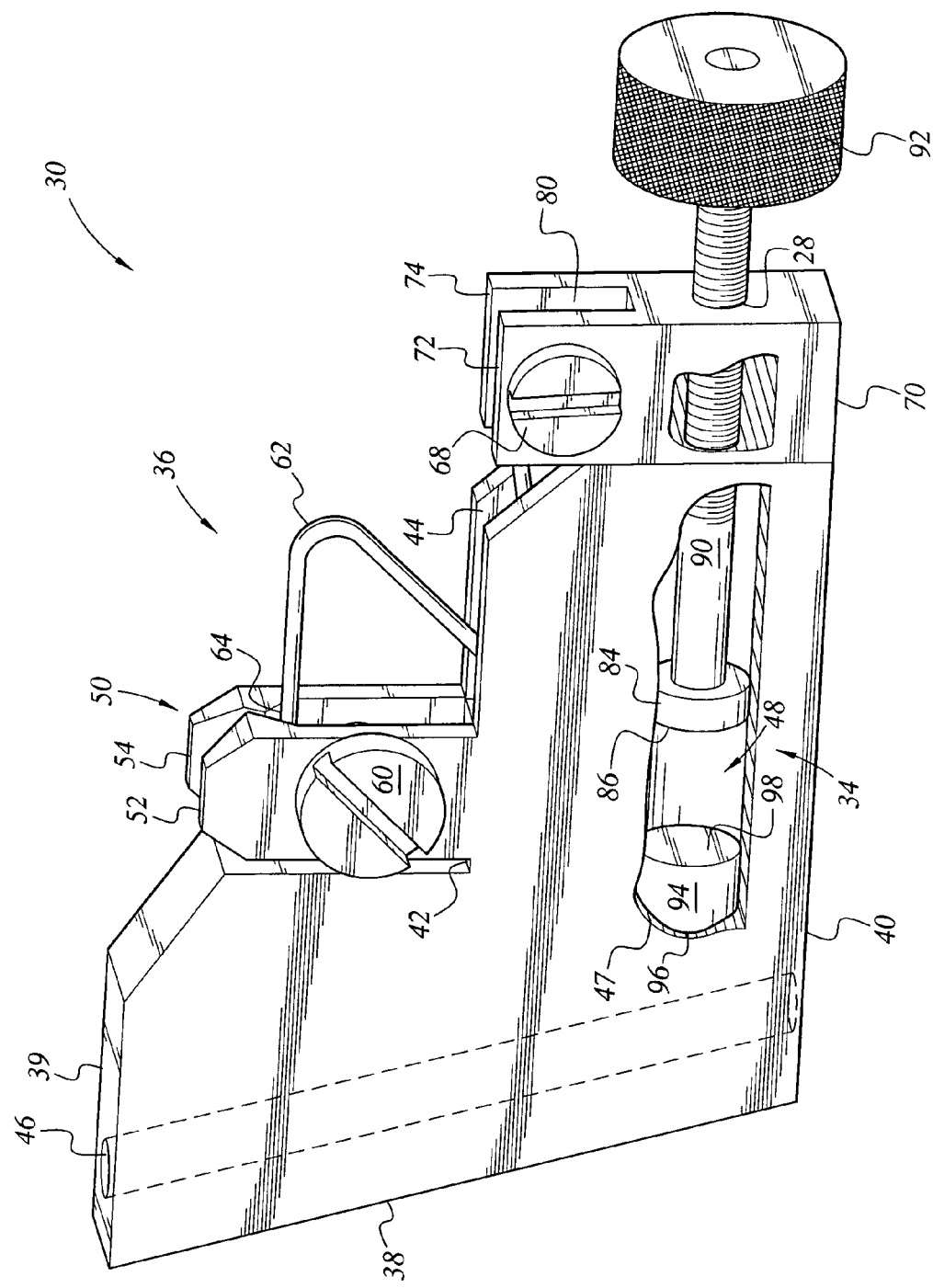
FIG. 4B is an elevational view of a devise for releasing fishing line used with a downrigger according to the present invention with part of the body cut away to show another tension setting position of the magnetic engaging member.

As illustrated in FIGS. 2, 4A and 4B, the adjustable magnetic engaging member 34 and the adjustable clip 50 provide two methods of adjustment the tension settings of the device 30, which allows the fisherman to adjust for tension created by water movement and for tension created by different sizes of fish. Advantageously, the adjustable clip 50 is adjustable to drag forces as low as 1-pound. The device 30 can be suspended at the desired depth in the water by the downrigger weighted cable 14 and the magnetic engaging member 34 can be set to the desired tension setting required for a particular size of fish that the fisherman would like to catch. When the fish of the appropriate size strikes the lead fishing line 22, the added tension pulls the magnetic engaging member 34 away from the magnet body 94 and pulls the fishing line releasing arm 62 away from the adjustable clip 50, which results in releasing fishing line 20 from the device 30.

It is to be understood that the present invention is not limited to the embodiments described above, but encompasses any and all embodiments within the scope of the following claims.

I claim:

1. A device for releasing fishing line used with downrigger, comprising:
   a body having a front face, a top face and a bottom face, the front face being orientated in a generally angular relationship with respect to the bottom face, said body having a downrigger aperture configured to frictionally hold a downrigger cable to said body at a predetermined length, said downrigger aperture being disposed between the top face and the bottom face, and being orientated in a generally parallel relationship with respect to the front face, said body defining a chamber having opposing first and second end portions, the first end portion defining an interior end wall configured for securing a magnetic body therein, the second end portion defining an exterior opening configured for slidable movement of a magnetic engaging member;
   said magnetic body having opposing front and rear portions, said magnetic body being positioned in said chamber so that the front portion of said magnetic body is adjacent to the end wall of said chamber and the rear portion of said magnetic body faces the exterior opening of said chamber;
   said magnetic engaging member having a head portion constructed and arranged for magnetically engaging with said magnetic body and a movable adjusting arm extending axially rearwardly from the head portion, said movable adjusting arm constructed and arranged such that movement thereof adjust the distance between said magnetic body and said magnetic engaging member and hence the magnetic force applied to the head portion of said magnetic engaging member by the rear portion of said magnetic body;
   a fishing line retaining mechanism arranged and configured to releasably hold a fishing line release member, said fishing line retaining mechanism being disposed on said body and being adjustable for adjusting the holding force being applied to said fishing line release member;
   said fishing line release member being adapted and configured for releasably attaching a fishing line with a fishing lure extending therefrom, said fishing line release member having a first end portion and a second end portion, the first end portion being releasably held to said fishing line retaining mechanism, the second end portion being pivotally connected to said magnetic engaging member; and
   wherein said magnetic engaging member slidably moves away from said magnetic body when a force being applied to the fishing lure extending from the fishing line, which is releasably attached to said fishing line release member, is sufficient to overcome the magnetic force being applied to the head portion of said magnetic engaging member by the rear portion of said magnetic body, and wherein movement thereof moves said fishing line release member in a rearwardly direction away from said body, causing said fishing line release member to disengage and pivot away from said fishing line retaining mechanism, which results in the fishing line being released from said fishing line release member.

2. The device for releasing fishing line used with downrigger according to claim 1, wherein said fishing line retaining mechanism includes an adjustable clip having a first member and a second member extending in side-by-side relationship to each other, said first and second members having interior surfaces with angular protrusion thereof, the interior surfaces being in opposed relationship to each other for retaining said fishing line release member, and an adjusting member connected to said first and second members for adjusting the spacing of said first and second members from each other.

3. The device for releasing fishing line used with downrigger according to claim 1, wherein said fishing line retaining mechanism includes first and second movable arms extending generally upwardly from opposing side edges of said body, said first and second movable arms having opposing fingers configured for retaining said fishing line release member, said first and second movable anns being movable into an abutting relation with each other.

4. The device for releasing fishing line used with downrigger according to claim 3, wherein said fishing line retaining mechanism includes a fastener inserted though a hole disposed on said first movable arm and threadably engaging an adjustment nut mounted on said second movable arm for adjusting the spacing of said first and second movable arms.

5. The device for releasing fishing line used with downrigger according to claim 1, wherein said magnetic engaging member includes a plunger slidably mounted within said chamber of said body and longitudinally movable in an axially direction relative to an axis of said chamber, said plunger being movable between a fishing line holding position, wherein an inner end portion of said plunger extends into said chamber so as to magnetically engage said magnetic body and hold said fishing releasing member within said fishing releasing mechanism, and a fishing line releasing position, wherein an exterior end portion of said plunger is operatively connected to said fishing releasing member so as to disengage said plunger from said magnetic body when a fish strikes the fishing lure of the fishing line with sufficient force to overcome the magnetic attraction between said magnetic body and said plunger, causing said plunger to move said fishing releasing member away from said fishing releasing mechanism, pivoting said fishing releasing member and releasing the fishing line therefrom.

6. The device for releasing fishing line used with downrigger according to claim 1, wherein said movable adjusting arm is a threaded member extending axially from said chamber of said body and operatively connected to a detachable hinged body having a first and second legs being substantially parallel with respect to each other and extending generally upwardly from side edge portions of said detachable hinged body, said first and second legs defining a space therebetween for pivotally mounting said fishing releasing member.

7. The device for releasing fishing line used with downrigger according to claim 6, wherein said fishing releasing member is a fishing line release arm having opposing first and second arm end portions, and at least one bend therebetween, the second arm end portion having a loop configured to receive a pivot member for pivotally mounting to said detachable hinged body, and the first arm end portion being relatively straight for releasably engaging said fishing releasing mechanism.

8. The device for releasing fishing line used with downrigger according to claim 7, wherein said fishing line release arm has a generally S-shape configuration.

9. The device for releasing fishing line used with downrigger according to claim 1, wherein said chamber is generally cylindrical with a longitudinal axis relatively parallel to the bottom face of said body.

10. A device for releasing fishing line used with downrigger, comprising:
   a body;
   a clip disposed on said body;
   a fishing line release arm having a first arm end portion and second arm end portion, said fishing line release arm constructed and arranged for releasably attaching a fishing line thereon;
   a detachable hinged body having a hinge and a threaded aperture, the hinge pivotally connected to the second arm end portion of said fishing line release arm for pivotal movement about a hinge axis between a fishing line holding position wherein the first arm end portion is releasably held by said clip, and a fishing line releasing position wherein the first arm end portion is released from and pivoted clear of said clip;
   a magnetic body mounted within said body; and
   a magnetic engaging member for movably holding said detachable hinged body adjacent to said body, said magnetic engaging member having a head end portion for magnetically engaging said magnetic body, a movable arm extending from the head portion for threadably engaging the threaded aperture of said detachable hinged body, and a knob fixed to end portion of the movable arm for adjusting the magnetic force between said magnetic engaging member and said magnetic body, said magnetic engaging member slidably mounted within said body and longitudinally movable in a relatively parallel direction with respect to said fishing line release arm so as to disengage said detachable hinge body from said body when a force being sufficient to overcome the magnetic force between said magnetic body and said magnetic engaging member is applied to a fishing lure of a fishing line, which is releasably attached to said fishing line release arm.

11. The device for releasing fishing line used with downrigger according to claim 10, wherein said body includes a downrigger aperture for frictional holding a downrigger cable.

12. The device for releasing fishing line used with downrigger according to claim 10, wherein said body includes a front face and a bottom face, the front face having a generally angular orientation with respect to the bottom face.

13. The device for releasing fishing line used with downrigger according to claim 12, wherein said body includes a downrigger aperture having a generally parallel orientation with respect to the front face.

14. The device for releasing fishing line used with downrigger according to claim 10, wherein said body includes an internal axial chamber having an axial exterior opening for slidable movement of said magnetic engaging member.

15. The device for releasing fishing line used with downrigger according to claim 14, wherein said magnetic body is mounted within a forward portion of the internal axial chamber opposite the axial exterior opening.

16. The device for releasing fishing line used with downrigger according to claim 10, wherein said body has a recess for receiving a portion of said fishing line release arm.

* * * * *